United States Patent
Millikan et al.

(10) Patent No.: US 7,702,721 B2
(45) Date of Patent: Apr. 20, 2010

(54) METHOD AND APPARATUS FOR PROVIDING MUSIC INFORMATION FOR A WIRELESS AUDIO PLAYER

(75) Inventors: Thomas N. Millikan, Austin, TX (US); Charles E. McCallum, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1040 days.

(21) Appl. No.: 10/256,696

(22) Filed: Sep. 27, 2002

(65) Prior Publication Data

US 2003/0069929 A1 Apr. 10, 2003

Related U.S. Application Data

(60) Provisional application No. 60/327,180, filed on Oct. 4, 2001.

(51) Int. Cl. *G06F 15/16* (2006.01)
(52) U.S. Cl. .............................. 709/203; 709/226; 707/3
(58) Field of Classification Search ................. 709/203, 709/206, 226; 707/3, 10
See application file for complete search history.

(56) References Cited

U.S. PATENT DOCUMENTS

| 5,619,731 | A  | * | 4/1997  | Jenkins et al.  | 711/150 |
|-----------|----|---|---------|-----------------|---------|
| 6,212,555 | B1 | * | 4/2001  | Brooks et al.   | 709/219 |
| 6,311,214 | B1 | * | 10/2001 | Rhoads          | 709/217 |
| 6,956,833 | B1 | * | 10/2005 | Yukie et al.    | 370/328 |
| 2002/0029216 | A1 | * | 3/2002  | Tzou         | 707/100 |
| 2002/0074413 | A1 | * | 6/2002  | Henzerling   | 235/492 |
| 2003/0005138 | A1 | * | 1/2003  | Giffin et al.| 709/231 |
| 2003/0135513 | A1 | * | 7/2003  | Quinn et al. | 707/102 |

* cited by examiner

*Primary Examiner*—Salad Abdullahi
*Assistant Examiner*—El Hadji M Sall
(74) *Attorney, Agent, or Firm*—Robert D. Marshall, Jr.; W. James Brady; Frederick J. Telecky, Jr.

(57) ABSTRACT

A method and apparatus for providing music information for a wireless CD player is disclosed. The CD player may transmit a substantially unique CD tag to a music information service computer system across a network via a wireless communications protocol. The music information service system then matches the CD tag to music data stored in a database. This music data is then transmitted to the CD player to be displayed to the user.

26 Claims, 2 Drawing Sheets

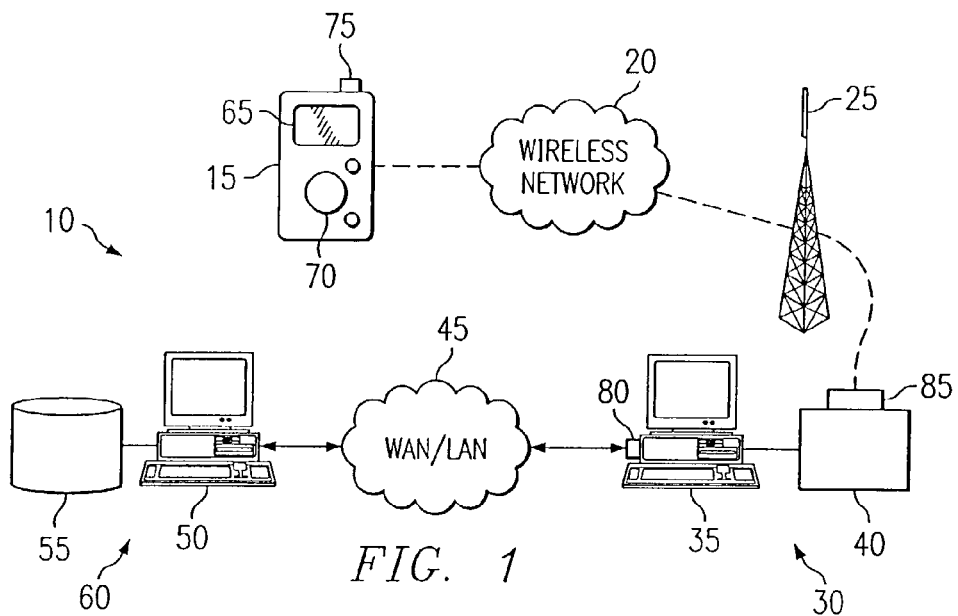
FIG. 1
| | BASIC INFORMATION {195} | | | | DETAILED INFORMATION {200} | | |
|---|---|---|---|---|---|---|---|
| CD TAG INDEX | ALBUM TITLE | ARTIST | TRACK INFORMATION | ○○○ | BIOGRAPHY | CONCERTS | ○○○ |
| 190 | 205 | 210 | 215 | | 220 | 225 | |
| ⋮ | ⋮ | ⋮ | ⋮ | ⋮ | ⋮ | ⋮ | ⋮ |
| | | | | | | | |
FIG. 3
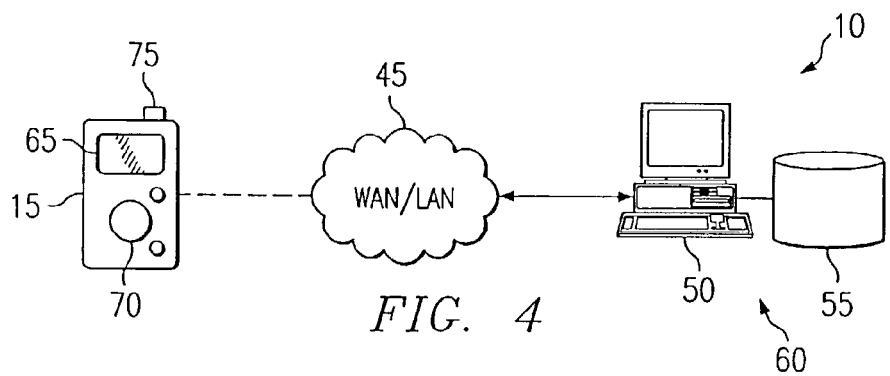
FIG. 4

METHOD AND APPARATUS FOR PROVIDING MUSIC INFORMATION FOR A WIRELESS AUDIO PLAYER

This application claims priority under 35 USC §119(e)(1) of Provisional Application No. 60/327,180, filed Oct. 4, 2001.

FIELD OF THE INVENTION

This invention relates in general to the field of music information databases and more particularly to a method and apparatus for providing music information for wireless devices.

BACKGROUND OF THE INVENTION

Music information services maintain databases of detailed information about artists, songs, albums, performances, and other music-related topics. One example of a music information service is the Gracenote CDDB Music Recognition Service. These music information services may license developers of CD players, CD burners, MP3 players and encoders, catalogers, and similar devices. The music information service allow the licensed devices or software to display artist, title, tracklist, and other music-related information that is maintained by the music information service to the user. For example, when a user plays a CD using a licensed device, the CD player software program for that device first accesses the music information service and transmits the table of contents (TOC) of the CD to the service. The CD player program accesses the music information service via a wire connection to the Internet or an Internet dial-up service. The music information service servers uses a match algorithm to check the TOC against the music information database to find one or more matches to the CD. Once the music information service has identified the CD or generated a list of matches, the CD player may display the information associated with that CD to the user or present the user with a list of matches from which to choose. As discussed above, this information may include the artist name, album title, track list, and other similar information.

Because music information services must be accessed from a wire connection or dial-up service to the Internet, the user is limited in the placement of the device to retrieve the music information service data. CD players that are not connected to the Internet must rely on cached music information service data or music information service CDs. Neither of these offline sources of information are as accurate or current as the music information service database itself. In addition, the user is unable to submit additional information or corrections to the music information service. Furthermore, users of portable CD players typically have no access to music information services at all.

SUMMARY OF THE INVENTION

Accordingly, a need has arisen for a method and apparatus for allowing users to access music information services from portable CD players and other similar portable devices. In accordance with the teachings of the present invention, a method and apparatus for allowing a user to access music information services for use with a portable CD player is provided that substantially eliminates or reduces the disadvantages and problems associated with prior techniques.

According to one exemplary embodiment of the present invention, a method and apparatus for providing a wireless portable CD player is disclosed, that allows a user to access a music information service. In one exemplary embodiment, when the user places a CD into the CD player, the user will be able to receive information regarding the CD from a music information service.

An important technical advantage of the present invention is that the user does not need to use a CD player that has wired connection to the Internet in order to access a music information service. As a result, a user may receive information from a music information service database from a portable CD player. Accordingly, the user of a portable CD player may receive the most current data from the music information service rather than from a static source, e.g a CD or cached data, that may not be accurate or current. Another important technical advantage of the present system is that accessing the music information service is relatively simple and information may be automatically provided to the user when a CD is inserted into the CD player.

BRIEF DESCRIPTION OF THE DRAWINGS

A more complete understanding of the present invention may be acquired by referring to the accompanying figures in which like reference numbers indicate like features and wherein:

FIG. 1 is a depiction of an exemplary embodiment of a wireless music information service and portable CD player network;

FIG. 3 is a depiction of an exemplary embodiment of a music information database;

FIG. 4 is a depiction of an exemplary embodiment of a wireless music information service and portable CD player network.

DETAILED DESCRIPTION OF THE INVENTION

Figure 2:
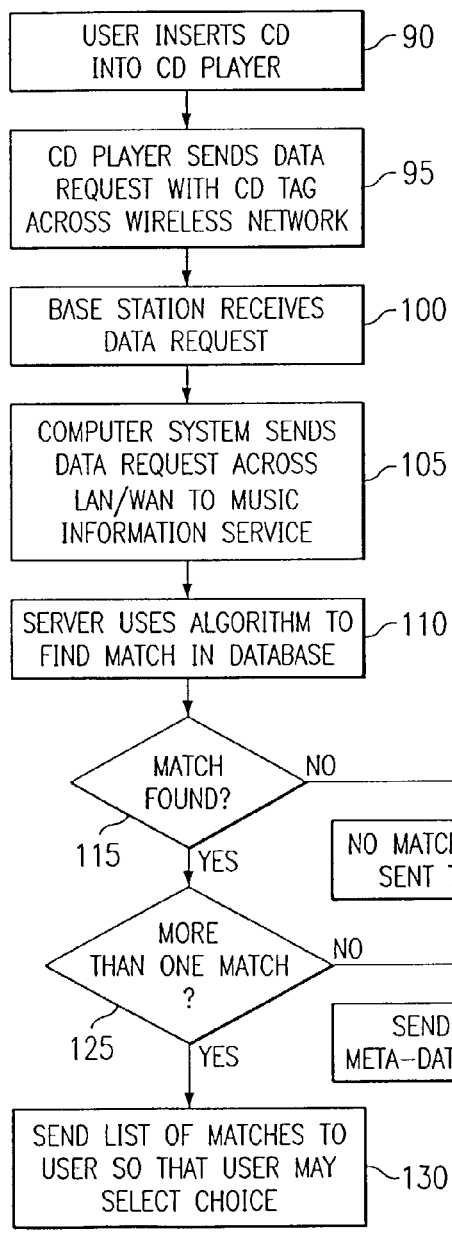
FIG. 2 is a flow diagram illustrating an exemplary embodiment of a method of using a wireless music information service and portable CD player network.

FIG. 1 shows a CD database access network, indicated generally at 10. CD player 15 is operable to play an audio CD, CD-ROM or similar disc. In one exemplary embodiment, CD player 15 is a portable CD player. CD player 15 contains a disc reading mechanism that includes a drive motor to spin the CD, a laser and a lens system to read data stored on the CD, and a tracking mechanism to move the laser assembly. CD player 15 generally includes other components and software necessary to read and process the data stored on the CD. CD player 15 includes a wireless transmission device 75 that is operable to send and receive data via a wireless data transmission protocol. Wireless transmission device 75 may be a wireless modem, a wireless telecommunications transceiver, or similar communications device. Examples of suitable wireless data transmission protocol include 802.1 lb, Bluetooth, Wireless Application Protocol (WAP), standard telecommunications protocol, and similar transmission or communicative protocols that enable wireless data transfer. As a result, CD player 15 is able to transmit and receive data via wireless network 20. CD player 15 includes display 65 suitable for display graphics or text. Display 65 may be an LCD or similar device. CD player includes controls 70 suitable for controlling the playback of a CD, navigating menus that may be shown on display 65, executing commands, sending information requests or data, or similar functions. Controls 70 may also include alphanumeric keyboard, for example.

Computer system 30 includes a personal computer 35 and base station 40. Personal computer 35 includes a modem 80 suitable for allowing data transmission between personal computer 35 and network 45. Network 45 may be a WAN, LAN or a similar network such as the Internet, for example. Personal computer 35 is communicatively connected to base station 40. Base station 40 includes a wireless transmission device 85 that is operable to send and receive data via a wireless data transmission protocol. Wireless transmission device 85 may be a wireless modem, a wireless telecommunications transceiver, or similar communications device. Examples of suitable wireless data transmission protocol include 802.1 1b, Bluetooth, Wireless Application Protocol (WAP), standard telecommunications protocol, and similar transmission or communicative protocols that enable wireless data transfer. Accordingly, CD player 15 and base station 40 may communicate across wireless network 20. Transmission tower 25 may be implemented to facilitate wireless communication across CD database access network 10. Base station 40 may also serve as a cradle for CD player 15. CD player 15 may be inserted into cradle 40 to upload or download data to computer system 30, receive power to recharge batteries, or similar operations.

As discussed above, modem 80 allows computer system 60 to connect to network 45. Music information service computer system 60 is also communicatively connected to network 45. Music information service computer system includes a server 50 and a database 55. Server 50 is any computer system suitable for receiving and transmitting data across network 45 and receiving and transmitting data to database 55. Database 50 may be a storage device or collection of storage devices suitable for storing data. Accordingly, a data request may be sent from CD player 15, across wireless network 20 to computer system 30. Computer system 30 relays this data request to music information service computer system 60 across network 45. Server 50 receives this data request and accesses data from database 55 in accordance with the request. The information may then be transmitted from server 50 to CD player 15 and displayed to the user on display 65.

Generally, commercially released audio CD contain, along with the audio content, a tag, label or code that may be used to recognize or identify the CD. For example, as discussed above, audio CDs contain a table of contents (TOC) that corresponds to the track lengths of the songs stored on the CD. The TOC may be used to identify the CD because it is extremely unlikely that two unrelated CDs would have the same TOC. Another example of a tag that may be used to identify a CD is a digital watermark that may be associated with the CD. Accordingly, a music information service may provide the meta-data associated with a CD or other information related to the CD to a user based on the CD's substantially unique tag, e.g. TOC. A user places a CD into CD player 15. The user may then request to view the meta-data associated with the CD, e.g. artist name, track title, song length, and so forth, and other information related to the CD, e.g. credits, year the CD or tracks were created, label, news relating to the artists, biographies of the artists, upcoming concerts to be performed by the artists, titles of other albums created by the artists or in the genre, among other information. The user may request the music information via controls 70. Alternatively, the request for music information may be automatically sent to the music information service when the CD is placed in the CD player.

The request for music information is transmitted across wireless network 20 by wireless transmission device 75 for CD player 15. This request includes the transmission of the CD's substantially unique tag, e.g. TOC. One or more transmission towers 25 may be implemented to facilitate the wireless transmission of information through network 10. Base station 85 receives the data request via wireless transmission device 80. Computer system 30 sends the data request across network 45 via modem 80. Music information service computer system 60 receives the data request from network 45. Server 50 processes the data request and searches through database 55 to collect the information responsive to the request. Because CDs may be identified by their CD tags, computer system 60 may index the music information stored in database 50 by the CD tag, e.g. TOC. Server 50 uses a matching algorithm to lookup the unique CD tag contained in the request to identify a match or list of possible matches from database 55. Server 50 transmits the music information across network 45 to computer system 30. In turn, computer system 30 transmits the information to CD player 15 across wireless network 20. The information may then be presented to the user via display 65 of CD player 15.

FIG. 2 is an exemplary embodiment of a method of using the CD database access network 10 shown in FIG. 1. At step 90, the user inserts a CD with a substantially unique CD tag into CD player 15. For example, the user may place the CD "A Hard Day's Night" from the musicians "The Beatles" into CD player 15. At step 95, either automatically or by user command, CD player 15 sends a request for music information with the unique CD tag across wireless network 20. This request includes the substantially unique tag associated with this CD, e.g. the TOC for the "A Hard Day's Night" CD. At step 100, base station 85 receives the request for music information transmitted across wireless network 20. At step 105, computer system 30 relays the music information request across network 45. The music information request is subsequently received by the music information service computer system 60. At step 110, server 50 uses a matching algorithm to search through the database to find matches to the unique CD tag, e.g. TOC.

FIG. 3 shows an exemplary embodiment of a CD music information database 55. Each entry 185 in CD database 55 corresponds to an album. The first column 190 of database 55 is a CD tag index. The CD tag index 190 contains the CD tag for each entry 185. Accordingly, server 50 may search through the CD tag index 190 column of the database to find a match between a database entry 185 and the CD tag submitted by CD player 15. For each album or entry 185, database 55 may have a basic information section 195 and a detailed information section 200. The basic information section 205 contains the data necessary for identifying the CD title, artist and tracks, e.g. the meta-data associated with the CD. For example, the basic information section 195 contains general information such as album title 205, artist name 210, track information 215, and similar data. Generally, this information may be displayed as text. Accordingly, a simple display 65 may be used to show this information. While the basic information section 195 contains information about the CD itself, the detailed information section 200 contains information that is indirectly related to the CD. For example, the detailed information section 200 may contain biography information for the artists 220, upcoming concerts 225, and similar data. The detailed information section may contain graphical or video information that requires a complex display 65 or robust network connection for downloading. As a result, CD player 15 capability and user choice may determine whether the detailed information is displayed in addition to the basic information.

At step 115, it is determined whether or not a match was found between the CD tag and an entry 185 in database 55.

Server 50 will identify a match if CD tag index 190 contains an entry that matches the CD tag, e.g. TOC. The algorithm used by server 50 determines what constitutes a match. Preferably, server 50 uses a fuzzy algorithm to determine whether or not a match has been found. If no match is found, then this message is communicated to the user at step 120. Depending on the controls 70 of CD player 15, the user may be able to submit the music information that is known to the user to the music information service computer system 60 so that database 55 may be updated. At step 125, it is determined whether or not a single match is found for the CD tag. If there are multiple matches, server 50 will transmit a list of matches to the user so that the user may select via controls 70 the entry 185 for which the user chooses to retrieve information. For example, the recording company may have pressed variations of the "A Hard Day's Night" album that may have similar TOCs. The user may then choose the appropriate album variation for which to receive information.

If a single match is found, then server 50 will then transmit the music information that is related to that entry 185 to the user, to the extent that the user has requested such information at step 135. If the user has only requested basic information, server 50 will only transmit data from the basic information section 195, e.g. the artist name, album title, track title and song length information. For example, for the "A Hard Day's Night" album, CD player 15 may now display the name of the artist as "The Beatles," and the name of the album as "A Hard Day's Night." Furthermore, CD player 15 may display the name of each track selected by the user, e.g. the first track will be identified as "A Hard Day's Night," the second track will be identified as "I Should Have Known Better," and so forth. If the user would like more information, server 50 may transmit information from the detailed information section 200, e.g. additional information related to the band, such as current news or biographies, additional albums by the artists, similar musicians or albums in the genre, current concert schedules and other categories, depending on what information the user requests. If the music information service computer system 60 identifies the wrong CD or provides music information that contains mistakes, e.g. a data entry error, then the user may provide the correct information to update database 55.

Figure 5:
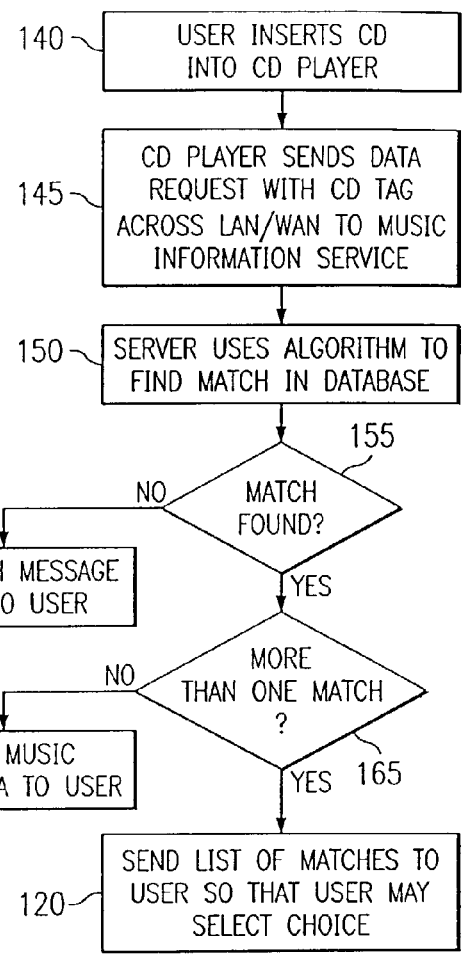
FIG. 5 is a flow diagram illustrating an exemplary embodiment of a method of using a wireless music information service and portable CD player network.

FIG. 4 shows another exemplary embodiment of CD database access network 10. In this embodiment, CD player 15 includes a wireless transmission device 75, such as a wireless modem, that is operable to access network 45 directly. As discussed above, network 45 may be a LAN, WAN, or similar network, such as the Internet. Accordingly, data requests may be sent directly from CD player 15 to Music information service computer system 60 over network 45. FIG. 5 is an exemplary embodiment of a method of using the CD database access network 10 shown in FIG. 4. At step 140, the user inserts a CD with a substantially unique CD tag into CD player 15. At step 145, either automatically or by user command, CD player 15 sends a request for music information with the unique CD tag across network 45 to music information service computer system 60. At step 150, server 50 uses a matching algorithm to search through database 55 to find matches to the unique CD tag. At step 155, it is determined whether there is at least one match. If not, the user is notified accordingly at step 160. If there is at least one match, it is determined whether there is a single match or multiple matches at step 165. If there are multiple matches, these choices are sent to the user at step 170. If there is only one match, the information associated with this entry 185 is sent to the user at step 175.

Although the present invention has been discussed with reference to using the CD's TOC as a substantially unique CD tag, it should be understood that the invention may be employed using any other type of substantially unique CD tag. Although the present invention has been discussed with reference to using CDs and a unique CD tag, it should be understood that the invention may be employed using compressed audio formats such as MP3 in conjunction with a unique digital tag, such as a digital watermark. Although the present invention has been described in detail, it should be understood that various alterations, changes, modifications, and substitutions may be made to the teachings described herein without departing from the scope of the present invention, which is solely defined by the appended claims.

What is claimed is:

1. A CD database access network for providing music information for a CD, wherein the CD is associated with a substantially unique CD tag, comprising:
   a network;
   a music information service computer system, wherein the music information service computer system is communicatively coupled to the network and comprises:
      a database operable to store music information, wherein the music information comprises basic information and detailed information about the CD, wherein detailed information includes a section containing graphical or video information and upcoming events, wherein the upcoming events are concerts to be performed by the artists; and
      a server operable to receive a data query that includes the unique CD tag, and search the database to locate and transmit the music information associated with the unique CD tag, wherein the unique CD tag is a table of contents associated with the CD; and
   a CD player coupled to the network, said CD player operable to play the CD, wherein the CD player further comprises:
      a wireless transmission device operable to transmit the data query and receive music information via a wireless transmission protocol;
      a display operable to display the music information;
      input controls operable to allow a user to enter music information; and
      wherein the wireless transmission device is operable to transmit the music information entered by the user for storage in the database;
   wherein the server use a fuzzy algorithm to search the database and to determine whether or not a match to the data query has been found;
   if a match is found, transmit the music information associated with the unique CD tag;
   if no match is found, then this message is communicated to the user;
   if there are multiple matches, the server will transmit a list of matches to the user so that the user may select via the input controls which information to retrieve.

2. The CD database access network of claim 1, wherein the basic information includes CD title information, artist information, and track information.

3. The CD database access network of claim 1, wherein the wireless transmission protocol is in accordance with a Bluetooth standard.

4. The CD database access network of claim 1, wherein the wireless transmission protocol is in accordance with a 802.11b standard.

5. The CD database access network of claim 1, wherein the wireless transmission protocol is a Wireless Application Protocol.

6. The CD database access network of claim 1, wherein the wireless transmission protocol is a standard telecommunications protocol.

7. The CD database access network of claim 1, wherein the wireless transmission device is operable to transmit and receive data across the network such that the CD player is operable to send and receive music information across the network.

8. The CD database access network of claim 7, wherein the network is a wide area network.

9. The CD database access network of claim 8, wherein the network is the internet.

10. The CD database access network of claim 1, further comprising:
   a wireless network;
   a computer system comprising
      a modem operable to send and receive data, such that the computer system is operable to send and receive the data and music information across the network; and
      a base station, comprising a second wireless transmission device operable to receive and transmit data according to the wireless transmission protocol, such that the computer system is operable to send and receive the data query and music information across the wireless network.

11. A CD player operable to play a CD, associated with a substantially unique CD tag, comprising:
   a wireless transmission device operable to send and receive data via a wireless transmission protocol, such that the CD player is operable to send a data query that includes the CD tag and receive music information, wherein the unique CD tag is a table of contents associated with the CD, wherein the music information comprises basic information and detailed information about the CD, wherein the detailed information includes a section containing graphical or video information and upcoming events, wherein the upcoming events are concerts to be performed by the artists; and
   a display operable to display the music information;
   input controls operable to allow a user to enter music information;
   wherein the wireless transmission device is operable to transmit the music information entered by the user for storage in a music information service computer system;
   wherein the server use a fuzzy algorithm to search the database and to determine whether or not a match to the data query has been found;
   if a match is found, the CD player is operable to receive the music information associated with the unique CD tag from the server;
   if no match is found, the CD player is operable to receive and display a corresponding message;
   if there are multiple matches, the CD player is operable to receive and display a list of matches from the server, and further operable to allow the user to select via the input controls which information to retrieve.

12. The CD player of claim 11, wherein the detailed information includes biography information for the artist.

13. The CD player of claim 11, wherein the wireless transmission protocol is in accordance with a Bluetooth standard.

14. The CD player of claim 11, wherein the wireless transmission protocol is in accordance with a 802.11b standard.

15. The CD player of claim 11, wherein the wireless transmission protocol is a Wireless Application Protocol.

16. The CD player of claim 11, wherein the wireless transmission protocol is a standard telecommunications protocol.

17. The CD player of claim 11, wherein the wireless transmission device is operable to send and receive data over a wide area network.

18. The CD player of claim 11, wherein the wide area network is the internet.

19. A method for providing music information for a wireless CD player operable to play a CD associated with a substantially unique CD tag, comprising the steps of:
   transmitting the CD tag via a wireless communications protocol, wherein the unique CD tag is a table of contents associated with the CD;
   receiving the CD tag;
   searching through a database of music information on a music information service computer system, wherein the music information comprises basic information and detailed information about the CD, wherein the detailed information includes a section containing graphical or video information and upcoming events, wherein the upcoming events are concerts to be performed by the artists, wherein the database comprises one or more database entries, to locate a match between the CD tag and a database entry according to an algorithm, wherein the server use a fuzzy alciorithm to search the database and to determine whether or not a match has been found;
   transmitting music information associated with the database entry to the CD player if the CD tag matches a single database entry;
   communicating a message to the user if no match is found;
   transmitting a list of matches to the user if there are multiple matches, so that the user may select via the input controls which information to retrieve; and
   revising the music information associated with the database entry on the music information service computer system.

20. The method of claim 19, further comprising the step of transmitting a list of matches if the CD tag matches a plurality of database entries.

21. The method of claim 19, wherein the music information associated with the database entry comprises meta-data associated with the CD.

22. The method of claim 19, wherein the step of transmitting the CD tag via a wireless communications protocol further comprises transmitting the CD tag across a wireless network.

23. The method of claim 22, wherein the step of receiving the CD tag is performed by a base station communicatively coupled to a computer system operable to transmit data across a wide area network.

24. The method of claim 23, further comprising the step of transmitting the CD tag across the wide area network to a music information service computer system.

25. The method of claim 24, wherein the music information service computer system comprises the database.

26. The method of claim 19, wherein revising the music information associated with the database entry includes a user providing information to update the database entry.

* * * * *